(No Model.)

M. DUDLEY.
SOLE EDGE FINISHER.

No. 246,944. Patented Sept. 13, 1881.

Witnesses
S. N. Piper
E. B. Pratt

Inventor.
Myrick Dudley.
by R. H. Eddy atty.

United States Patent Office.

MYRICK DUDLEY, OF LYNN, MASSACHUSETTS, ASSIGNOR TO HIMSELF AND ALBERT F. AVERY, OF SAME PLACE.

SOLE-EDGE FINISHER.

SPECIFICATION forming part of Letters Patent No. 246,944, dated September 13, 1881.

Application filed June 27, 1881. (No model.)

*To all whom it may concern:*

Be it known that I, MYRICK DUDLEY, of Lynn, of the county of Essex and State of Massachusetts, have invented a new and useful Improvement in Sole-Edge Finishers; and I do hereby declare the same to be described in the following specification and represented in the accompanying drawings, of which—

Figure 1:
Figure 3:
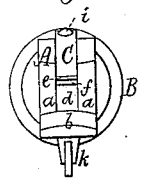
Figure 2:
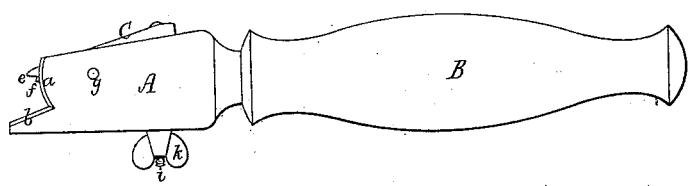
Figure 4:
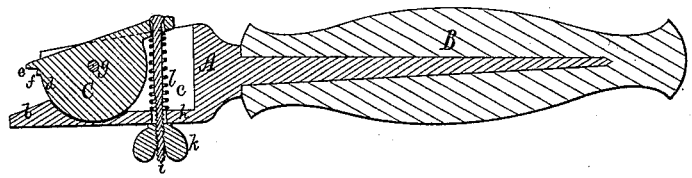

Figure 1 is a top view, Fig. 2 a side view, Fig. 3 a front end view, and Fig. 4 a longitudinal section, of a sole-edge finisher of my improved kind, the nature of my invention being defined by the claim hereinafter made.

In this sole-edge finisher the edge-molder and its guide-lip and a portion of the burnisher are adjustable relatively to the guide-lip and the remainder of the burnisher, such being to adapt the implement to soles of different thicknesses.

In the drawings, A denotes the tool-head, and B the handle thereof, such head at its operative end being provided with a curved burnisher or surface, *a*, and a guide-lip, *b*, arranged as shown. Within the head is a chamber, *c*, for the reception of the adjustable block C, the said chamber opening through the burnishing-surface *a* and the top of the head, and being extended back from the lip *b*. The adjustable block C has at its outer end a burnishing-surface, *d*, in continuation of or correspondence with the surface *a*, and arranged with the guide-lip *e* and edge-molder *f* projecting from the block C, in manner as shown. The said block C turns on a pin, *g*, going through it and the head, and arranged as represented, and there extends from the rear part of the block C down through the bottom *h* of the head a screw, *i*, furnished with a thumb-nut, *k*. This screw goes through a spiral spring, *l*, which, at its ends, bears against the said bottom and block, all being arranged as represented. On revolving the thumb-nut one way the block C will be moved or turned on its pin *g*, so as to carry the lip *e* and molder *f* away from the lip *b*; but by turning the nut the opposite way the spring *l* will produce a counter movement of the block C, whereby the lip *e* and molder *f* will be made to approach the lip *b*, the burnishing-surface *d* being always within the surface *a*, though movable with the lip *e* and molder *f*. From this it will be seen that the said lip *e* and molder *f* can be set nearer to or farther from the lip *b*, as the thickness of a shoe or boot sole to be operated on may require.

In using the implement, a workman, seizing it by its handle, and resting the lip *b* against the outer face of the sole, and inserting the lip *e* between the upper and the sole, and pressing the burnishing and molding surfaces against the sole-edge, is to impart to the implement a reciprocating motion, the result being the smoothing and molding the sole at its edge.

The burnishing-surfaces of the head and block are curved with a radius whose center is in the axis of the pivotal pin *g*.

I would remark that, instead of being operated by manual power applied to the handle B, the sole-edge finisher may be worked by mechanism so as to produce the molding and burnishing or finishing of a sole-edge.

There are important differences between my sole-edge finisher and that described in the United States Patent No. 236,760, for in mine the adjustable block C has a burnishing-surface, *d*, which is within that of the head A and bounded on opposite edges by it, whereas such is not the case with the adjustable grooved flange shown in such patent, it being without any such burnishing-surface extending from it within and bounded on its opposite edges by the burnishing-surface of the burnishing-block, the slotted lug for carrying the guard-flange being outside of and at one end of and below the burnishing-surface of the block. Furthermore, I have a means of adjusting the block C differing entirely from a screw and a slotted lug, as shown in the said patent, the means I use causing the block to be moved automatically either way on the nut being revolved, and not requiring such block to be moved by hand.

I claim as my invention in the described sole-edge finisher the following, viz:

The combination of the head A, provided with the guide-lip *b* and burnishing-surface *a*, as described, with the separate adjustable block C, arranged in and pivoted to the said head in manner as represented, and having the burnishing-surface *d*, guide-lip *e*, and edge-molder *f*, and means of adjusting such block in the head, as explained.

MYRICK DUDLEY.

Witnesses:
GEO. E. AVERY,
FRANK NELSON.